United States Patent [19]

John

[11] 4,390,793

[45] Jun. 28, 1983

[54] ELECTRONIC LIQUID LEVEL CONTROL APPARATUS

[75] Inventor: Robert S. John, Deerfield, Ill.

[73] Assignee: International Telephone and Telegraph Corporation, New York, N.Y.

[21] Appl. No.: 236,842

[22] Filed: Feb. 23, 1981

[51] Int. Cl.³ .................... G05D 9/12; H01H 35/18
[52] U.S. Cl. .............................. 307/118; 73/304 R; 137/392
[58] Field of Search ......... 73/304 R; 307/118, 252 N; 340/620; 137/392

[56] References Cited

U.S. PATENT DOCUMENTS

| | | | |
|---|---|---|---|
| 3,119,266 | 1/1964 | Atkinson | 73/304 R |
| 3,783,369 | 1/1974 | Chambers | 307/252 N |
| 3,922,564 | 11/1975 | Kackuk et al. | 73/304 R X |
| 4,019,067 | 4/1977 | Gladstone | 73/304 R X |
| 4,027,172 | 5/1977 | Hamelink | 73/304 R X |
| 4,259,982 | 4/1981 | Bartels | 73/304 R X |
| 4,263,587 | 4/1981 | John | 73/304 R |

Primary Examiner—Daniel M. Yasich
Attorney, Agent, or Firm—James B. Raden; Marvin M. Chaban

[57] ABSTRACT

Liquid level control system in which there is a basic resistive level sensing electrode or probe extending into a vessel or tank containing liquid. In addition there is a conductive guard ring or shield insulated from both the probe and from the conductive member or portion of the body of the vessel. The guard ring electrode acts as a current source to counteract electrical leakage across the surfaces between the probe and vessel body to minimize the effects of leakage and maintain the liquid level sensing control operative under most leakage conditions by balancing the leakage currents. In the event the leakage becomes excessive, a control is activated to signal the excessive leakage condition in a suitable manner.

7 Claims, 3 Drawing Figures

ELECTRONIC LIQUID LEVEL CONTROL APPARATUS

BACKGROUND OF THE INVENTION

Conductive probe level control circuits are well known, as shown by U.S. Pat. No. 4,019,067 issued Apr. 19, 1977 to R. Gladstone. In this circuit, a low voltage AC is impressed between the probe or sensing electrode and the containing vessel for the liquid. The sensing output acts on the control electrode of an SCR to activate a relay or the like.

Guard ring or guard shield electrodes for controlling leakage paths are known from U.S. patents such as U.S. Pat. No. 3,119,266 issued Jan. 28, 1964 to D. Atkinson and U.S. Pat. No. 4,027,172 issued May 31, 1977 to W. Hamelink. In the first of these two patents, the guard ring or shield is driven in phase with the probe voltage by an amplifier in the probe output circuit to raise the effective impedance of the leakage resistance counteracting the leakage effects.

In the second of the two cited references, U.S. Pat. No. 4,027,172, direct current leakage paths are placed in shunt of the probe. Excessive current leakage across either of two leakage paths (guard shield to probe or guard shield to tank body) shunts out the probe path and causes an output signal to deactivate the apparatus.

SUMMARY OF THE INVENTION

The present invention combines features of all those cited references in a simple, improved multifunction electronic probe control circuit for water level control. An electronic probe is used to sense the resistance of liquid in the tank in which the liquid level is being sensed. In the present invention, a low voltage alternating current is impressed on the probe to actuate an output circuit when liquid is present in the tank as evidenced by low resistance between the probe and a grounded electrode. The output circuit has as its main element an SCR which is active during successive half cycles of the alternating current to provide an output condition or indication of the liquid level.

A guard shield or ring is used to sense surface leakage currents in the probe area and the build up of scale or films of foreign matter affecting the resistance conditions across the probe body. The resistance from the guard ring to the probe and to the grounded tank is sensed and compensation is provided responsive to lowering of the guard ring to tank resistance to retain the liquid level sensing function operative even under conditions of heavy leakage.

In the basic circuit as shown, the resistance of the liquid is sensed during positive half cycles of the alternating current impressed between the probe and the grounded tank shell. In-phase compensation for leakage resistances is provided by an amplifier which is activated only during alternate half cycles and whose functioning may be maintained during intervening half cycles by a storage capacitor.

An automatic shut off may be provided which operates only when the leakage resistance drops below a predetermined minimal level based on a sensing function active only during alternate half cycles.

It is therefore an object of the present invention to provide an improved apparatus for electronic liquid level control using electrode or probe sensing of liquid level. A guard ring or shield is used for counteracting the build up of scale and other probe contaminants to compensate for any such build up. When the contaminant build up reaches a predetermined condition, the apparatus may either be shut off or an indicator activated.

DETAILED DESCRIPTION

Figure 1:
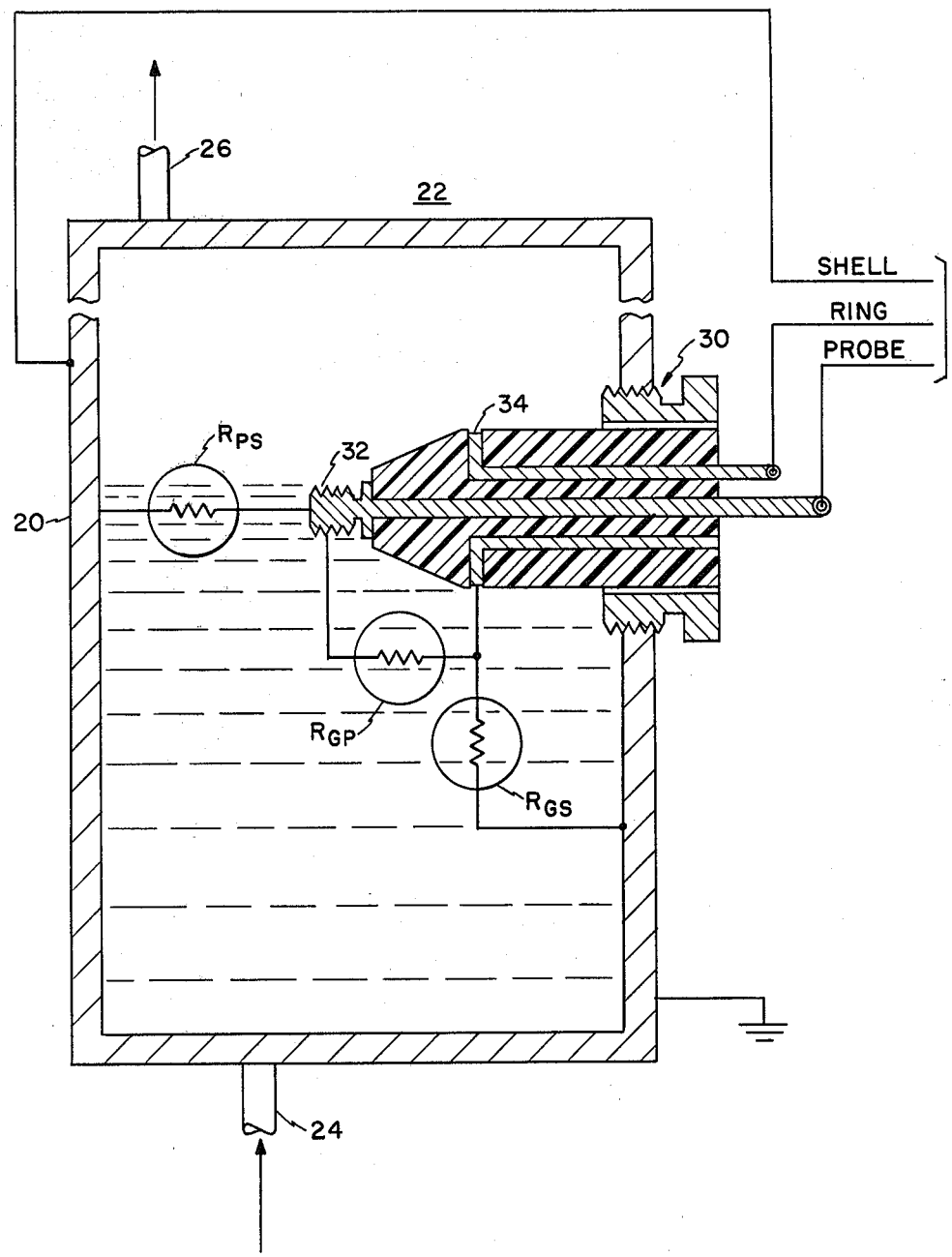
FIG. 1 is a schematic drawing generally in section of a probe assembly which may be used with my invention.

In FIG. 1, I show a tank container or vessel 22 which is adapted to contain liquid received from inlet 24 and which may exhaust liquid through a valved outlet tube 26. Normally liquid stands in the tank 22 to a desired level as controlled by the level control probe assembly 30.

As is generally known, the assembly 30 includes a conductive electrode or probe 32 which extends horizontally into the interior of the tank at a desired level. The assembly includes a conductive guard ring 34 insulated both from the probe and the tank wall or shell 20. The shell 20 is also used as a conductive circuit member, as is conventional. An assembly of this type is well-known in the art, the guard ring being used to distinguish resistance caused by the liquid and resistance caused by fouling or contaminant build up leading to leakage across the probe surface. The guard ring is physically located between the probe tip and the shell electrode. In FIG. 1, I show schematically the resistances of tank liquid between shell and probe ($R_{PS}$), between probe and guard ring ($R_{PG}$) and between guard ring ad shell ($R_{GS}$).

The circuit as shown and described herein may also be used with a probe tip or electrode extending vertically into the container (not shown).

Figure 2:
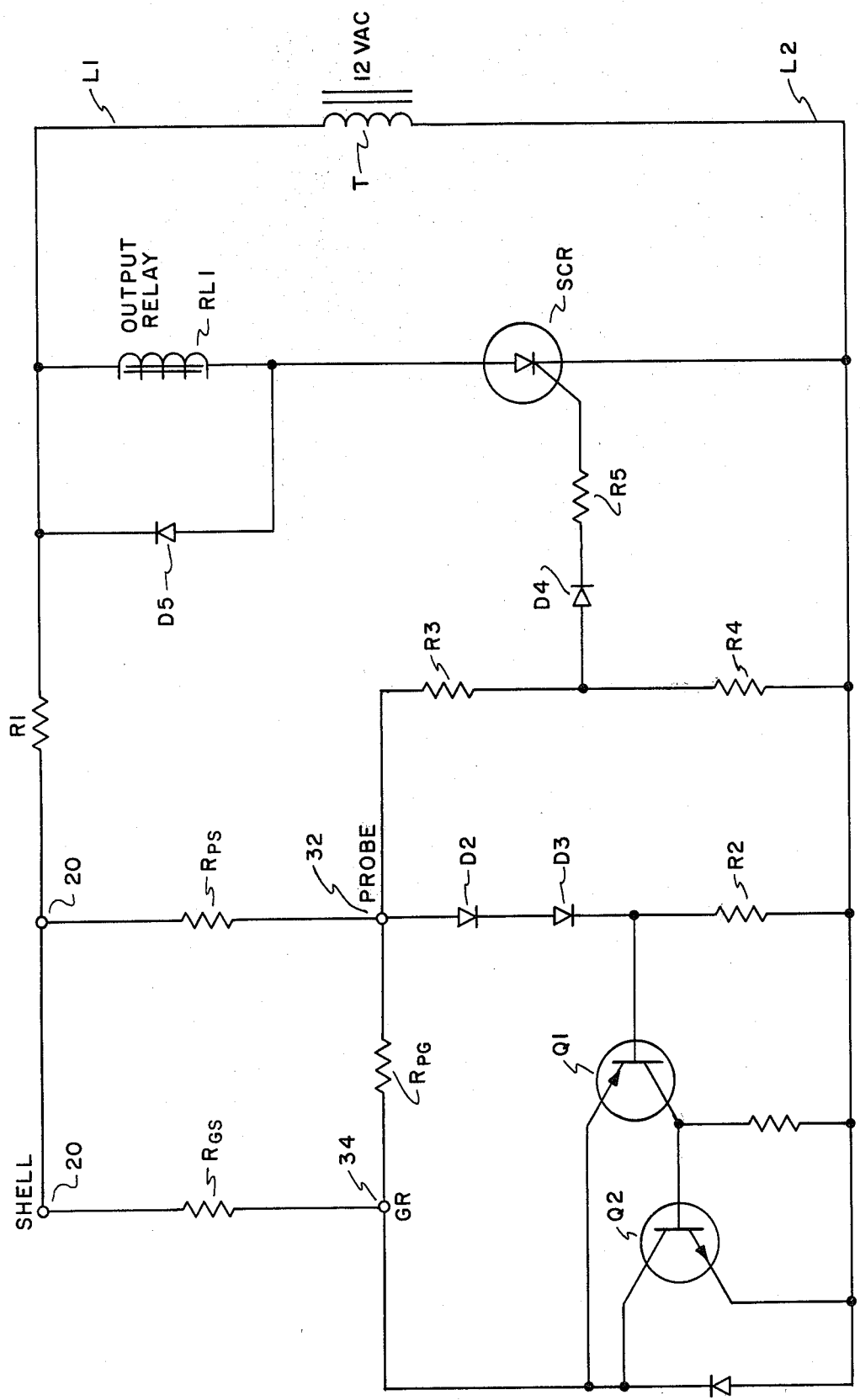
FIG. 2 is a schematic circuit diagram using one embodiment of my invention.

In FIG. 2, I show a circuit using an assembly such as shown in FIG. 1, to provide active compensation responsive to changes in leakage resistance. The secondary of transformer T produces a 12 volt AC output from conventional 120 volt AC across the secondary leads L1 and L2. Across the transformer secondary is a voltage divider arrangement including a basic level sensing path through the resistance of the liquid in the tank. This basic sensing circuit path may be traced from lead L1 through the resistor R1, the tank shell 20, $R_{PS}$ (the liquid in the tank) to probe 32, resistors R3 and R4 and back to the transformer on lead L2. With a low resistance of the liquid, ($R_{PS}$) the voltage at the probe tip 32 becomes more positive during the positive half cycle to produce a pulse through the output circuit including resistor R3, diode D4, resistor R5 and the gate of the SCR. The SCR provides the output circuit for the assembly. The SCR becomes conductive to complete a path to relay RL1 to cause relay RL1 to operate. Diode D5 aids in reducing excessive reverse voltages across the SCR caused by collapsing magnetic fields when the relay coil current is interrupted.

A basic compensating circuit may be traced from the L1 side of the transformer through resistor R1, liquid resistance $R_{PS}$, diodes D2 and D3, resistor R2 to the other transformer lead with amplifier Q1/Q2 input across R2, output to guard ring 34. The voltage of the probe tip is transmitted through diodes D3 and D2 to the base of PNP transistor Q1, the input to an amplifier comprised of transistors Q1 and Q2 in a compounded emitter follower configuration. As the guard/shell resistance ($R_{GS}$) decreases, with other conditions being unchanged, the peak output current from Q1/Q2 increases to maintain the guard voltage at a constant value. As the probe tip/guard ($R_{PG}$) resistance across the amplifier decreases, the amplifier output current also tends to increase, depending on both the guard/shell and liquid resistances. As the liquid resistance ($R_{PS}$) decreases, the amplifier output current tends to decrease, depending on the leakage resistances, and the PNP input is driven more positive or toward transistor current cutoff. As the guard/shell resistance ($R_{GS}$) decreases, increasing currents are required from the power source, and these are (for positive supply) limited only by the amplifier output capability, and during the negative supply polarity by only the protective rectifier across the amplifier output.

A possible excessive current condition is avoided by including a fuse or a current-limiting resistor R1 in the circuit. For a probe supply voltage of 12 VAC across the transformer leads L1, L2, a 100 ohm resistor R1 in the supply lead can limit such currents to a maximum peak value of about 170 milliamperes, a current level within the capability of many low-power transistors and transformers. This 100 ohm resistor (R1) has an important secondary effect of reducing the voltage supply across the probe itself when the leakage resistance from shell to guard electrode ($R_{GS}$) becomes very low. For example, when $R_{GS}$ approaches zero, the voltage from shell to guard approaches zero, and most of the 12 VAC supply is dropped across the 100 ohms. The signal current at the tip then depends on $R_{PS}$ in parallel with $R_{GS}$, as modified by the amplifier.

It is therefore possible for the leakage resistances to approach very low values without causing automatic failure of the liquid detection feature. The range of liquid resistances over which the circuit can detect properly can be varied by selection of the total sensing resistance connected from the probe tip to the SCR return. The effect of these features of the guard electrode probe and circuit greatly reduces probe surface leakage currents which have to be supplied by the probe tip, thereby greatly multiplying the effective value of leakage resistances across the probe, especially near the critical switching voltage of the output circuit.

The purpose of the compensation performed by the amplifier is to actively maintain the guard ring 34 approximately the same voltage level as the probe tip 32. In this way, the effect of the surface leakage between the guard ring and probe tip or shell can be prevented from providing a false liquid level indication to the output circuit of the SCR. For example, if the driving level of the SCR is at the one volt level, the voltage at the probe tip will be at or above that level when liquid is present at the probe tip. The amplifier Q1–Q2 provides countering currents to maintain the voltage level at the guard ring at the probe tip by offsetting any leakage currents due to a lowering of resistance ($R_{GS}$) between the guard ring and the tank shell.

If the resistance $R_{PS}$ between the shell and the probe tip is high and the leakage resistances ($R_{GS}$ and $R_{PG}$) are low, the compensating effect of amplifier Q1–Q2 will offset the leakage currents, so that the output circuit will only sense the shell to probe voltage.

Within the circuit of FIG. 2, the resistance of resistor R1 is inserted in series in one power lead (L1) to the sensing circuit which comprises the voltage divider ($R_{ps}$, $R_3$ and $R_4$) and the gating lead to the SCR to provide protection against total failure of the circuit in response to the presence of shorts within the leakage paths through the liquid.

In the presence of heavy leakage currents through the liquid to the guard ring, the output of amplifier Q1–Q2 will increase to offset the currents and the major voltage drops will be across resistor R1, thereby lowering the voltage at the probe tip to a level below the required SCR turn on voltage. This feature forms an automatic shut off for the system in the event of heavy leakage currents.

The resistance of Resistor R1 has been selected to be approximately 100 ohms. A higher series resistance would disrupt the liquid level sensing function and would undermine the amplification of Q1–Q2. With a low resistance of R1, insufficient current restriction could cause the amplifier to receive excessive currents with possible transistor burn out.

Figure 3:
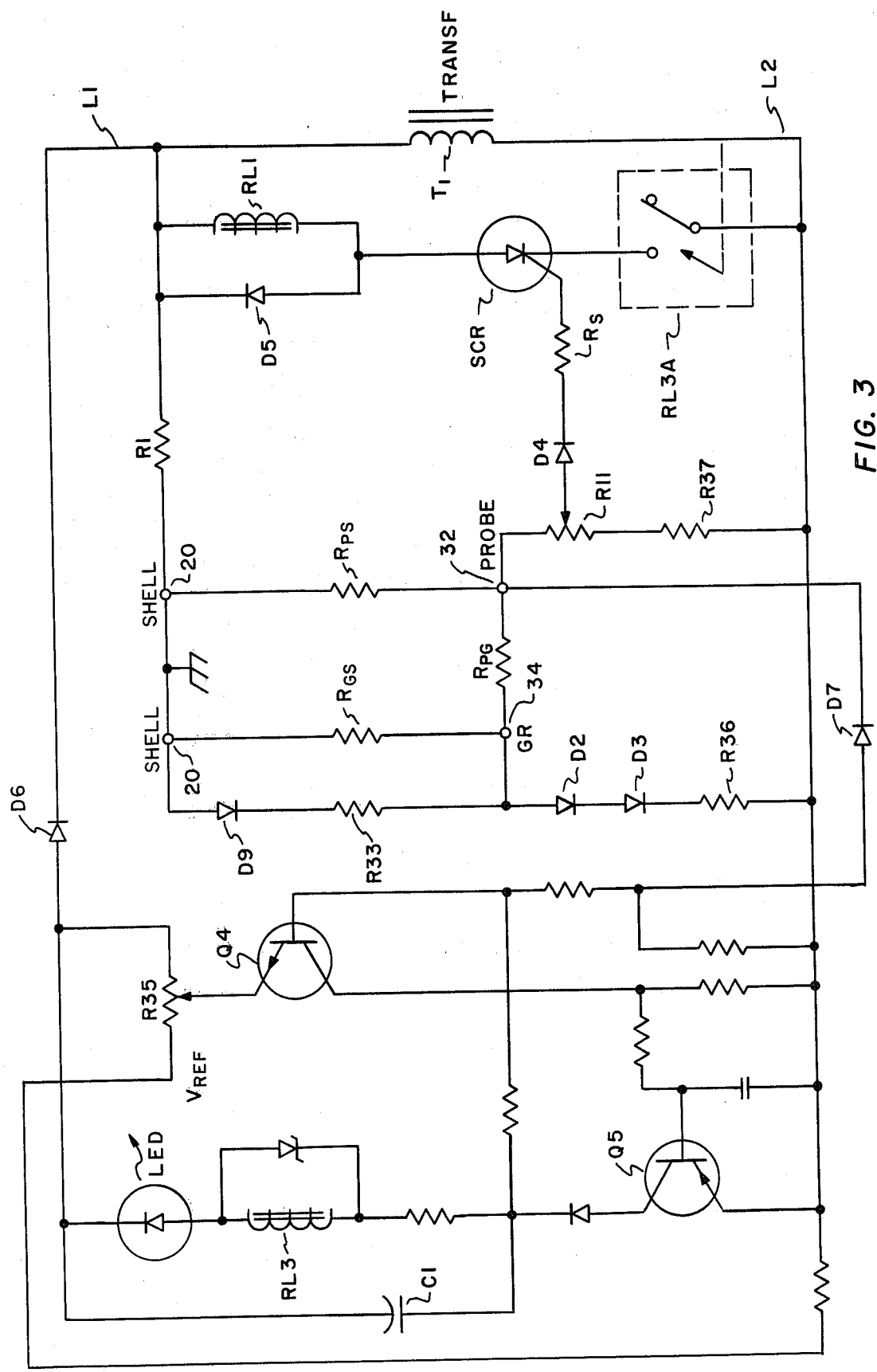
FIG. 3 is a schematic circuit diagram of a further embodiment of my invention.

FIG. 3 shows combined circuit using passive compensation and an active automatic leakage monitoring shut down circuit fed from the sensing circuit through diode D7. A portion of the circuit is similar to that of FIG. 2 in the arrangement of the liquid level sensing circuit and the output circuit comprising the SCR. In FIG. 3, the series diode pair D2, D3 is coupled to the guard ring 34 to provide automatic passive compensation for increased leakage currents. In addition, a shunt path across the shell to ring resistance ($R_{GS}$) is provided through diode D9 and resistor R33. This shunt path establishes a voltage across diodes D2, D3. A further resistor, variable resistance R11 as a minimum portion of sensing resistance means R37 may be provided in the path to diode D4 to allow the resistance to be varied in setting the SCR conductance level.

A leakage monitoring circuit is connected to the probe tip through diode D7 is provided to activate the automatic leakage shut off circuit only during monitoring and the negative half cycles. Diodes D7 prevents any probe tip voltage changes from reaching the leakage monitoring circuits through the base of transistor Q4 during positive half cycles. In this leakage monitoring circuit comprised of transistors Q4 and Q5, relay $R_{L3}$ and their biasing resistors and capacitors, if the signal at the probe tip is too high, when compared to a reference voltage it is assumed that the added signal is attributable to leakage problems. Thus, during the negative half cycles, the entire signal at the probe tip is analyzed by transistor Q4.

In the circuit of FIG. 3, the NPN transistor Q4 compares the negative probe tip voltage with $V_{REF}$, $V_{REF}$ being a reference voltage derived from transformer lead L1 through diode D6 and potentiometer R35. The setting of potentiometer R35 is adjusted by correlation between the voltage at the probe tip at the input to the SCR circuit as a factor of the shunt and passive compensating path from lead L1 through D9, R33, D2, D3 and R36. The collector current of transistor Q4 shuts off when the tip becomes more negative than $V_{REF}$. This, in turn, shuts off the collector current in the PNP driver transistor Q5, turning off the optional LED indicator and the normally operated DC relay RL3. An electrolytic capacitor C1 retains the status of relay R13 between successive negative half cycles of the AC input. The function of the transistor pair (Q4–Q5) could be performed by any other suitable type of voltage comparison arrangement.

The contacts RL3A of relay RL3 could be connected in the anode cathode path of the SCR circuit, as shown, to control its operation of the output control relay RL1. Alternately, other control functions could be performed by the protection circuit of relay RL3 as required.

In order that the action of the protection circuit will not interfere with that of the primary liquid detection circuit portion, guard electrode leakage compensation is required. The basic purpose of the guard electrode compensation circuit is to force any currents to the probe tip to flow from probe tip to shell only, with the probe so configured that this path can only be *through* the liquid to be detected, rather than across the fouled surface of the probe. This is accomplished by making the voltage at the guard shield 34 equal to that at the probe tip 32. The guard shield-to-tip current is thus reduced to zero, whatever the actual path resistance between them. This result is actually needed only at the instant during the AC supply cycle when the tip signal is presented to the output for detection.

At other times, the guard shield to probe tip currents will not affect the operation of the probe control. A simple reference voltage source is therefore connected to the guard ring 34 and the reference voltage is chosen to be equal to the tip voltage at which the output detector circuit just triggers to change its state. In this way, the guard shield-to-tip current is decreased to zero only at the critical instant of detector triggering.

In the circuit of FIG. 3, the guard electrode reference voltage is developed by the current through two series-connected rectifiers D2 and D3 and a low value resistor R36. The current is provided by the liquid and leakage currents and by a resistor R33 connected to the shell electrode. The main purpose of the low value resistor R36 is to counteract partly the droop of the liquid detection response curves, the droop being caused by the action of the current-limiting resistor R1 at low values of leakage resistance. A secondary effect of this resistor occurs, however, at extremely low probe leakage resistances, when either the guard electrode voltage or the signal-shunting by the guard electrode circuit becomes so high that the input of the output switch corresponds to a liquid present condition.

The range of liquid resistance over which the circuit detects properly can be varied by choice of the value of the sensing resistor means R37. The range of leakage resistances which can then be compensated for is determined by the setting of the potentiometer R11 included as part of $R_{PS}$, as it controls the leakage current range at which the potentiometer output signal just equals the critical firing voltage of the (SCR) detector.

The effect of these various aspects of the guard electrode circuit is to reduce the leakage currents to approximately zero at the critical switching voltages of the output, thereby greatly multiplying the effective value of the leakage resistance at that point. Since this guard electrode circuit as described fails at extremely low leakage resistances, the negative half cycle protection circuit is added to disable the output at such times, insuring than no unsafe boiler operation will occur due to an improperly cleaned and maintained conductance probe.

With the apparatus shown, both active and passive leakage compensation techniques are employed and passive and active automatic shut down techniques are disclosed.

I claim:

1. An apparatus for monitoring the level of liquid in a container in which the container comprising a conductive member in contact with any liquid in the container, a probe assembly mounted in said container to contact liquid at least reaching a predetermined level in the container; said probe assembly includes a liquid level sensing probe member positioned to be contacted by liquid in the container reaching said predetermined level, and a guard shield spaced from said probe member and insulated electrically therefrom, said shield and said probe member being insulated electrically from said container conductive member, a source of alternating current, the invention comprising a voltage divider across said source of current and including in said divider resistance of liquid between the container conductive member and the probe member, a sensing circuit path in parallel with the liquid resistance, said parallel path including the liquid and surface leakage between the conductive member, the probe member and the guard shield for monitoring circuit leakage from said members to said guard shield, an circuit coupled to said voltage divider and biased to respond to voltage conditions in said divider sensed between said probe member and said conductive member during alternate half cycles of the current from the source to produce a monitoring output indicative of liquid reaching said level, a leakage monitoring circuit coupled to said probe member and biased to monitor circuit leakage conditions during the intervening half cycles of the current from the source for interrupting the output circuit responsive to excessive surface leakage conditions monitored during said intervening half cycles.

2. Apparatus as claimed in claim 1, in which there is compensating circuit means for interacting with the first output circuit responsive to lessening of the resistance in said parallel path indicative of excessive leakage conditions at said guard shield as indicated by resistance in said parallel path lessening to below a predetermined amount for producing an increased voltage to said probe member.

3. A control apparatus for monitoring the level of liquid within a generally closed tank, the apparatus including a conductive probe member extending into the tank to be engaged by liquid in the tank extending to at least a predetermined level, said tank comprising a further conductive member contacted by liquid in the tank, a source of alternating current impressing a voltage across a path between the conductive members; an output circuit coupled to the probe member for producing an output signal in response to a voltage between said conductive members indicative of liquid resistive path between said members, a guard electrode in said tank mounted for contact by liquid in the tank at substantially the predetermined level, circuit means for connecting said guard electrode to said current source to complete a path in parallel with the resistive path between said members, said parallel path responsive to leakage of current from said conductive members to said guard electrode which will tend to shunt voltage between said members thereby impairing the level monitoring of said apparatus, amplifier means in circuit means responsive to leakage to said guard electrode to automatically raise the voltage of said guard electrode toward the voltage of said probe member whereby to reduce the shunting of voltage to said monitoring and in which said compensating means comprises an amplifier in said circuit means for increasing voltage to said guard electrode during alternate half cycles of the alternating current from said source.

4. A control apparatus as claimed in claim 3, in which said amplifier comprises a pair of transistors in compounded emitter follower configuration.

5. A control apparatus as claimed in claim 3, in which there is a resistance in series between said source and both said paths to maintain the current through said circuit at least at a predetermined level regardless of the leakage currents to said guard electrode.

6. Control apparatus for monitoring the level of liquid within a generally closed tank, the apparatus including a conductive probe member extending into the tank for engagement by liquid in the tank reaching to at least a predetermined level, said tank including a conductive member in engagement with liquid in the tank, a source of alternating current impressing a voltage across a monitoring path through liquid in the tank between the conductive members, an output circuit coupled to the path for producing an output during alternate half cycles in response to a voltage between members indicative of liquid in the tank to at least said predetermined level, a guard electrode in said tank insulated from said conductive members and mounted for contact with liquid in the tank at substantially the predetermined level, circuit means for connecting the guard electrode to said alternating current source to complete a path in shunt of said path between said conductive members, said circuit means responsive to leakage of current between the guard electrode and said conductive members to shunt said monitoring path to impair the monitoring of liquid in the tank, a leakage monitoring circuit operative during intervening half cycles between the alternate half cycles during which an output is produced for interrupting the output when the voltage at said guard electrode exceeds a reference voltage indicative of leakage across said shunt path.

7. Control apparatus as claimed in claim 6, in which there is means in said leakage monitoring circuit for maintaining said output interruption during the alternate half cycles.

* * * * *